United States Patent
Kawano et al.

(10) Patent No.: US 12,522,690 B2
(45) Date of Patent: Jan. 13, 2026

(54) EPOXY RESIN, EPOXY COMPOUND, EPOXY RESIN COMPOSITION, RESIN SHEET, PREPREG, CARBON FIBER REINFORCED COMPOSITE MATERIAL AND PHENOL RESIN

(71) Applicant: Nippon Kayaku Kabushiki Kaisha, Tokyo (JP)

(72) Inventors: Yusuke Kawano, Tokyo (JP); Masataka Nakanishi, Tokyo (JP); Masato Yarita, Tokyo (JP); Kazuma Inoue, Tokyo (JP)

(73) Assignee: NIPPON KAYAKU KABUSHIKI KAISHA, Tokyo (JP)

(*) Notice: Subject to any disclaimer, the term of this patent is extended or adjusted under 35 U.S.C. 154(b) by 599 days.

(21) Appl. No.: 17/913,176

(22) PCT Filed: Mar. 17, 2021

(86) PCT No.: PCT/JP2021/010920
§ 371 (c)(1),
(2) Date: Sep. 21, 2022

(87) PCT Pub. No.: WO2021/193303
PCT Pub. Date: Sep. 30, 2021

(65) Prior Publication Data
US 2023/0143162 A1 May 11, 2023

(30) Foreign Application Priority Data
Mar. 23, 2020 (JP) .................. 2020-051069

(51) Int. Cl.
| | |
|---|---|
| C08J 5/24 | (2006.01) |
| C08G 59/06 | (2006.01) |
| C08G 59/32 | (2006.01) |
| C08G 59/62 | (2006.01) |
| C08G 61/12 | (2006.01) |
| C08J 5/18 | (2006.01) |
| C08L 63/00 | (2006.01) |

(52) U.S. Cl.
CPC .......... *C08G 59/621* (2013.01); *C08G 59/06* (2013.01); *C08G 61/12* (2013.01); *C08J 5/18* (2013.01); *C08J 5/243* (2021.05); *C08J 2363/00* (2013.01)

(58) Field of Classification Search
CPC ....... C08L 63/00; C09D 163/00; C09J 163/00
USPC .................................. 523/427, 428
See application file for complete search history.

(56) References Cited

U.S. PATENT DOCUMENTS

| | | | |
|---|---|---|---|
| 4,764,571 A * | 8/1988 | Namba | C08G 61/02 525/534 |
| 6,379,799 B1 * | 4/2002 | Almen | C08G 59/3218 428/297.4 |

FOREIGN PATENT DOCUMENTS

| | | |
|---|---|---|
| JP | 1-101362 A | 4/1989 |
| JP | 05339340 A * | 12/1993 |
| JP | 7-252373 A | 10/1995 |
| JP | 10182939 A * | 7/1998 |
| JP | 2002-105166 A | 4/2002 |
| WO | 2011/019061 A1 | 2/2011 |

OTHER PUBLICATIONS

Partial Google Translation of JP-01101362-A (no date).*
Machine translation of JP-05339340-A (no date).*
Machine translation of JP-10182939-A (no date).*
Japanese communication, with English translation, dated Sep. 14, 2021 in corresponding Japanese patent application No. 2021-538670.
Japanese communication, with English translation, dated Nov. 30, 2021 in corresponding Japanese patent application No. 2021-538670.
International Search Report and Written Opinion mailed May 25, 2021 in corresponding PCT application No. PCT/JP2021/010920.

(Continued)

*Primary Examiner* — Michael J Feely
(74) *Attorney, Agent, or Firm* — Nields, Lemack & Frame, LLC

(57) ABSTRACT

An epoxy resin represented by the following formula (1), in which in a total amount of an epoxy compound represented by n=1 in the epoxy resin of the above formula, a total content of an epoxy compound represented by the following formula (2) and an epoxy compound represented by the following formula (3) is 1 area % or more and less than 70 area % in HPLC area percentage.

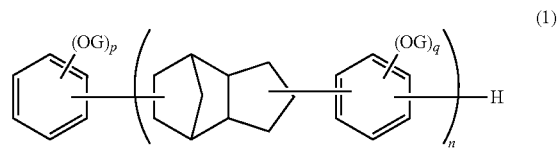

(1)

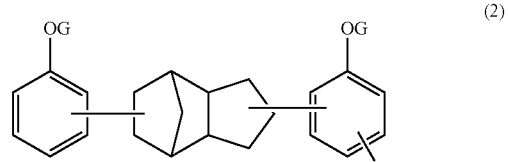

(2)

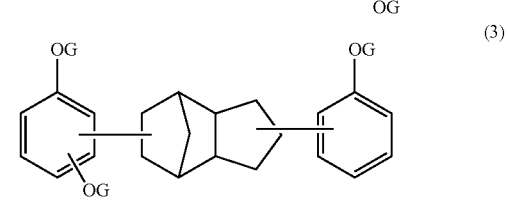

(3)

18 Claims, 7 Drawing Sheets

(56) References Cited

OTHER PUBLICATIONS

European communication dated Mar. 5, 2024 in corresponding European patent application No. 21775660.0.

* cited by examiner

EPOXY RESIN, EPOXY COMPOUND, EPOXY RESIN COMPOSITION, RESIN SHEET, PREPREG, CARBON FIBER REINFORCED COMPOSITE MATERIAL AND PHENOL RESIN

TECHNICAL FIELD

The present invention relates to an epoxy resin, an epoxy compound, an epoxy resin composition, a resin sheet, and a prepreg suitable for a carbon fiber reinforced composite material, a carbon fiber reinforced composite material obtained by curing the above, and a phenol resin.

BACKGROUND ART

Epoxy resins are cured with various curing agents to form cured products with excellent mechanical properties, water resistance, chemical resistance, heat resistance, electrical properties, etc., and are used in a wide range of fields such as adhesives, paints, laminated boards, molding materials, and casting materials. A carbon fiber reinforced composite material (CFRP), which is made by impregnating reinforcing fibers with an epoxy resin and a curing agent as a matrix resin and performing curing, has characteristics such as weight reduction and high strength, and in recent years, has thus been widely used in aircraft structural members, wind turbine blades, automobile outer panels, and computer applications such as IC trays and laptop housings, and the demand is increasing.

Generally, examples of the resin used for the matrix resin for CFRP or the like include materials such as a bisphenol A type epoxy resin, a bisphenol F type epoxy resin, and tetraglycidyl diaminodiphenylmethane. In addition, in aircraft applications, glycidylamine type epoxy resins such as tetraglycidyl diaminodiphenylmethane are used.

In recent years, with the spreading of CFRP, the required characteristics for the matrix resin are becoming stricter, and when CFRP is applied to structural materials of aerospace applications and vehicles, heat resistance against 180° C. or higher is required for the matrix resin (Patent Literature 1). The glycidylamine-based material has high heat resistance, but has a problem of deterioration in characteristics after water absorption because of having a high water absorption rate. On the other hand, the general glycidyl ether type epoxy resin has a problem that the elastic modulus is low although the water absorption rate is relatively low. Therefore, there is a demand for a material that satisfies high heat resistance, a high elastic modulus, high strength, and a low water absorption rate.

Examples of the epoxy resin having a low water absorption rate include a dicyclopentadiene type epoxy resin, a phenol aralkyl type epoxy resin, and an epoxy resin having a naphthalene skeleton. Among these, the dicyclopentadiene type epoxy resin is one of the epoxy resins useful as the matrix resin for carbon fiber reinforced composite material because of having a relatively long distance between cross-linking points, high mechanical strength, a hydrophobic chemical structure, and a low water absorption rate.

CITATION LIST

Patent Literature

Patent Literature 1: JP-A-2013-155330
Patent Literature 2: JP-B-S62-20206

SUMMARY OF INVENTION

Technical Problem

In general, the dicyclopentadiene type epoxy resin has a relatively long distance between cross-linking points, so that the mechanical strength is high, but on the other hand, the problem is that the heat resistance (Tg) is low due to the long distance between cross-linking points. In general, as a method of increasing the heat resistance (Tg), there is a method of increasing the molecular weight of the epoxy resin and reducing the molecular motion. However, this method is not preferred because the melt viscosity of the resin is increased, the impregnation into carbon fibers is remarkably lowered, and the strength of the molded carbon fiber reinforced composite material may be lowered.

Another method of increasing the heat resistance (Tg) is to use a polyfunctional phenol compound as a raw material for the epoxy resin. However, this method is not preferred because when the crosslink density increases too much, the crosslink density becomes remarkably high and the mechanical strength of the cured product becomes brittle. In addition, it is not preferred because the water absorption rate is increased due to the influence of the hydroxy group generated after the reaction between the epoxy resin and the curing agent.

In view of the above problems, an object of the present invention is to provide an epoxy resin, an epoxy compound, and an epoxy resin composition which have a low melt viscosity and whose cured product is excellent in high heat resistance, high elastic modulus, and low water absorption property, materials using the above, and a phenol resin as raw materials for the above.

Solution to Problem

As a result of intensive studies, the present inventors have found that a cured product of a dicyclopentadiene type epoxy resin having a specific structure is excellent in high heat resistance, high elastic modulus, and low water absorption property.

That is, the present invention is shown in the following [1] to [10].

[1] An epoxy resin represented by the following formula (1), wherein
in a total amount of an epoxy compound represented by n=1 in the epoxy resin, a total content of an epoxy compound represented by the following formula (2) and an epoxy compound represented by the following formula (3) is 1 area % or more and less than 70 area % in HPLC area percentage.

[Chem. 1]

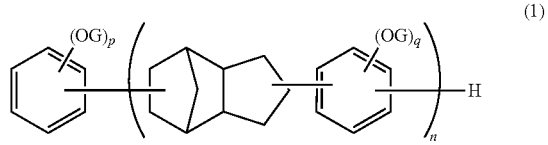

(1)

In the formula (1), G represents a substituted or unsubstituted glycidyl group, p and q are present independently of each other and each represents a real number of 1 or 2, and n represents a real number of 1 to 20.

[Chem. 2]

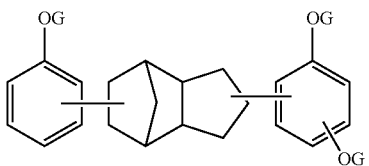

(2)

In the formula (2), G represents a substituted or unsubstituted glycidyl group.

[Chem. 3]

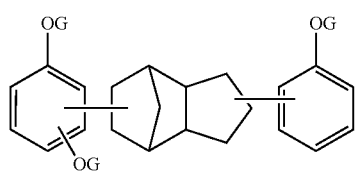

(3)

In the formula (3), G represents a substituted or unsubstituted glycidyl group.

[2] The epoxy resin described in the above [1], in which an epoxy equivalent is 200 g/eq. or more and less than 230 g/eq.

[3] An epoxy compound represented by the following formula (2) or the following formula (3).

[Chem. 4]

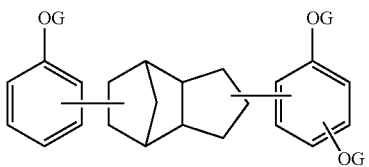

(2)

In the formula (2), G represents a substituted or unsubstituted glycidyl group.

[Chem. 5]

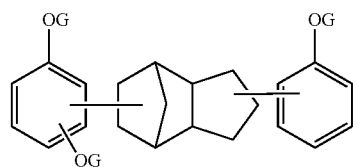

(3)

In the formula (3), G represents a substituted or unsubstituted glycidyl group.

[4] An epoxy resin composition containing: the epoxy resin described in the above [1] or [2] or the epoxy compound described in the above [3]; and a curing agent.

[5] The epoxy resin composition described in the above [4], in which the curing agent is an amine-based curing agent or a phenol-based curing agent.

[6] The epoxy resin composition described in the above [4] or [5], which is used for a carbon fiber reinforced composite material.

[7] A resin sheet obtained by coating a support base with the epoxy resin composition described in any one of the above [4] to [6].

[8] A prepreg obtained by impregnating a carbon fiber with the epoxy resin composition described in any one of the above [4] to [6] or the resin sheet described in the above [7].

[9] A carbon fiber reinforced composite material obtained by curing the epoxy resin composition described in the above [6] or the prepreg described in the above [8].

[10] A phenol resin represented by the following formula (4), wherein a hydroxyl group equivalent is 135 g/eq. or more and less than 160 g/eq.

[Chem. 6]

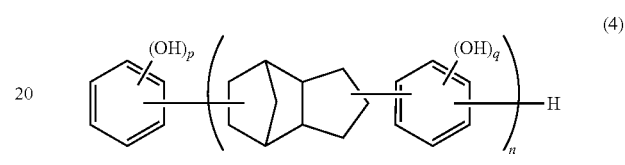

(4)

In the formula (4), p and q are present independently of each other and each represents a real number of 1 or 2, and n represents a real number of 1 to 20.

Advantageous Effects of Invention

According to the present invention, it is possible to provide an epoxy resin and an epoxy resin composition whose cured product has high strength and a high elastic modulus, and a resin sheet, a prepreg, and a carbon fiber reinforced composite material using the above.

DESCRIPTION OF EMBODIMENTS

Figure 1:
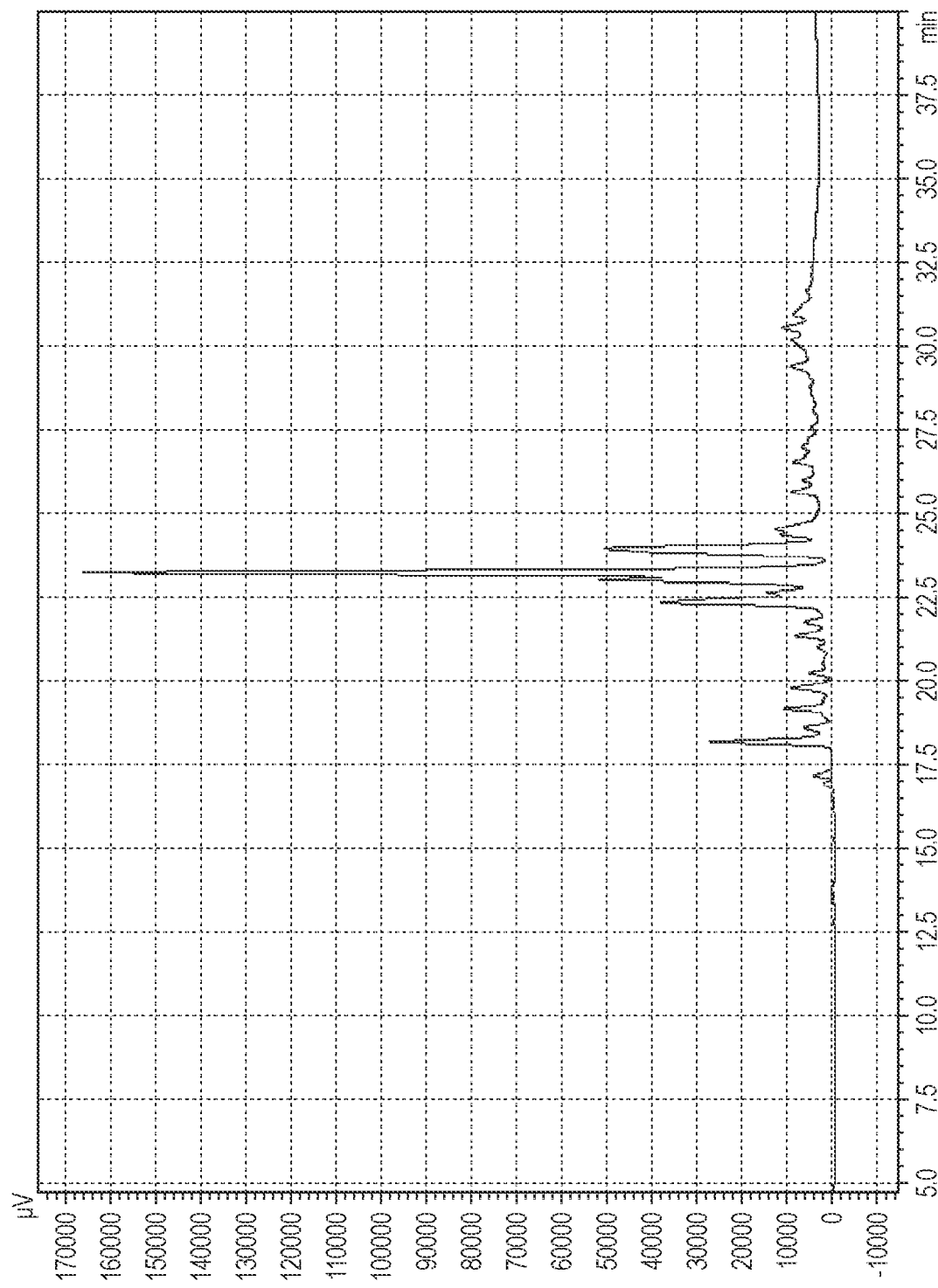
FIG. 1 is a high performance liquid chromatograph chart of Synthesis Example 1.

An epoxy resin according to an embodiment of the present invention is an epoxy resin represented by the following formula (1), in which in a total amount of an epoxy compound represented by n=1 in the epoxy resin, a total content of an epoxy compound represented by the following formula (2) and an epoxy compound represented by the following formula (3) is 1 area % or more and less than 70 area % in HPLC area percentage.

[Chem. 7]

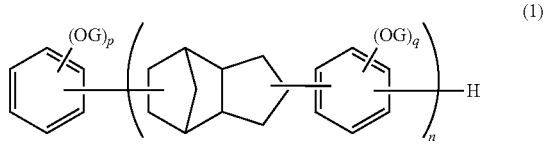

(1)

In the formula (1), G represents a substituted or unsubstituted glycidyl group, p and q are present independently of each other and each represents a real number of 1 or 2, and n represents a real number of 1 to 20.

[Chem. 8]

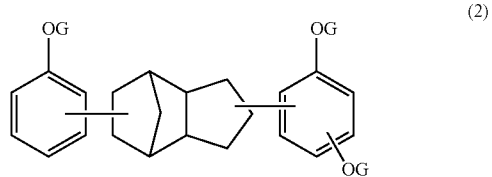

(2)

In the formula (2), G represents a substituted or unsubstituted glycidyl group.

[Chem. 9]

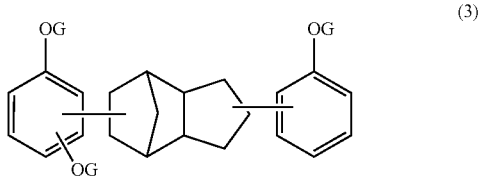

(3)

In the formula (3), G represents a substituted or unsubstituted glycidyl group.

In the formula (1), G is a substituted or unsubstituted glycidyl group, and the substituent is preferably an alkyl group, and particularly preferably a methyl group.

In the formula (1), the orientation of the glycidyl ether group when p and q are 2 may be any of an ortho-position, a meta-position, and a para-position with respect to one glycidyl ether group, and preferably a meta-position.

In the formula (1), the value of n can be calculated based on the number average molecular weight obtained by the measurement with gel permeation chromatography (GPC, detector: RI) for the epoxy resin, or the area ratio of the separated peaks. n is usually a real number of 1 to 20, and is preferably 1 to 10, and more preferably 1 to 5.

The epoxy equivalent of the epoxy resin according to the present embodiment is preferably 190 g/eq. or more and less than 230 g/eq., more preferably 200 g/eq. or more and less than 230 g/eq., still more preferably 210 g/eq. or more and less than 230 g/eq., and particularly preferably 220 g/eq. or more and less than 228 g/eq. When the epoxy equivalent is 190 g/eq. or more, a high elastic modulus is obtained, and when the epoxy equivalent is less than 230 g/eq., good heat resistance is obtained.

The epoxy resin according to the present embodiment has a resin-like form having a softening point. Here, the softening point is preferably 50° C. to 90° C., more preferably 60° C. to 75° C., and still more preferably 60° C. to 68° C. A softening point of 50° C. or higher means that the molecular weight distribution is appropriate or there is no residual solvent, the heat resistance is good, and problems such as poor curing and voids during molding can be prevented. On the contrary, when the softening point is 90° C. or lower, the handling during kneading with other resins is good.

The melt viscosity (ICI melt viscosity (150° C.), cone-plate method) is preferably 0.05 Pa's or more and 1.0 Pa's or less, more preferably 0.06 Pa's or more and 0.2 Pa's or less, and still more preferably 0.07 Pa's or more and 0.1 Pa's or less. When the melt viscosity is 0.05 Pa's or more, an appropriate molecular weight distribution is obtained and the solubility in a solvent is good. On the contrary, when the melt viscosity is 1.0 Pa's or less, the handling during kneading with other resins is good.

In the formula (1), when n=1, an epoxy compound, in which one of p and q is 1 and the other is 2, is represented by the above formula (2) or (3).

In the formulas (2) and (3), G is a substituted or unsubstituted glycidyl group, and the substituent is preferably an alkyl group, and particularly preferably a methyl group.

In addition, the orientation when the benzene ring has two substituted or unsubstituted glycidyl ether groups may be any of an ortho-position, a meta-position, and a para-position with respect to one glycidyl ether group, and preferably a meta-position.

The total content of the epoxy compound represented by the formula (2) and the epoxy compound represented by the formula (3) can be determined by an analysis method using two methods, gel permeation chromatography analysis and high performance liquid chromatography analysis.

Gel Permeation Chromatography (GPC) Analysis
  Manufacturer: Waters
  Column: Guard column SHODEX GPC KF-601 (2), KF-602, KF-602.5, KF-603
  Flow rate: 1.23 ml/min.
  Column temperature: 25° C.
  Solvent used: tetrahydrofuran (THF)
  Detector: differential refractometer (RI)
  High performance liquid chromatography analysis
  Liquid transfer unit LC-20AD manufactured by Shimadzu Corporation
  Photodiode array detector SPD-M20A manufactured by Shimadzu Corporation
  Column oven CTO-20A manufactured by Shimadzu Corporation
  Column: Intersil ODS-2, 5 μm, 4.6×250 mm, 40° C.
  Mobile Phase A: acetonitrile (AN)
  Mobile Phase B: water (W)
Time Program:
  0 to 28 min. AN/W=30%/70%→100%/0%
  28 to 40 min. AN/W=100%/0%
  Flow rate: 1.0 mL/min.
  Detection: UV 274 nm, PDA With the gel permeation chromatography analysis, the content ratio (α) of an n=1 component in the epoxy resin represented by the formula (1) can be obtained, and with the high performance liquid chromatography analysis, the content ratio 032) of the epoxy resin represented by the formula (2) and the content ratio (133) of the epoxy resin represented by the formula (3) contained in the n=1 component can be obtained. For example, the product of α and β2 is the content ratio of the epoxy resin represented by the formula (2) contained in the epoxy resin represented by the formula (1).

In addition, the content ratio of the epoxy compound of the formula (2) and the epoxy compound of the formula (3) contained in the epoxy resin of the formula (1) is represented by $\alpha \times (\beta 2 + \beta 3)$. Specifically, the content ratio of the epoxy compound of the formula (2) and the epoxy compound of the formula (3) contained in the epoxy resin of the formula (1) is represented by "(GPC area % of the epoxy compound represented by n=1 in the epoxy resin of the formula (1))×{(HPLC area % of the epoxy compound represented by the formula (2) with respect to the entire epoxy compound represented by n=1)+(HPLC area % of the epoxy compound represented by the formula (3) with respect to the entire epoxy compound represented by n=1 by HPLC analysis)}".

In the present embodiment, the total content of the epoxy compound represented by the following formula (2) and the epoxy compound represented by the following formula (3) is 1 area % or more and less than 70 area %, preferably 1 area % or more and less than 30 area %, more preferably 3 areas or more and less than 20 area %, and particularly preferably 5 areas or more and 15 areas or less, in terms of HPLC area percentage in the total amount of the epoxy resin represented by the formula (1) when n=1. When the ratio is less than 70 area%, a high elastic modulus is obtained, and when the ratio is 1 areas or more, good heat resistance is obtained, which is preferred.

The total content ratio of the epoxy compound represented by the following formula (2) and the epoxy compound represented by the following formula (3) is preferably 1 area % or more and 20 area % or less, more preferably 3 area % or more and 15 area % or less, and particularly preferably 5 area % or more and 10 area % or less in the in the epoxy resin represented by the formula (1). When the ratio is 20 area % or less, a high elastic modulus is obtained, and when the ratio is 1 area % or more, good heat resistance is obtained, which is preferred. The "area %" here is the product of the above GPC area % and HPLC area %.

In the epoxy resin according to the present embodiment, epoxy resins having p and q of 1 or 2 in the formula (1) coexist. By controlling p and q, the crosslink density of the cured product can be adjusted, and a cured product having excellent heat resistance and mechanical characteristics can be obtained. When both p and q are 1, excellent mechanical strength is exhibited, but the heat resistance is poor due to a low crosslink density. On the other hand, when both p and q are 2, that is, when the functional group density is increased, the heat resistance is improved, while the mechanical strength is decreased since the resin becomes hard and brittle due to an increase in crosslink density, resulting in a remarkable increase in water absorption rate. When the water absorption rate is increased, there are harmful effects such as a remarkable decrease in strength after water absorption. This is because the epoxy group density is too high and the characteristics deteriorate due to the polarity of the epoxy group, but also because the epoxy groups are close to each other and cannot react well with the curing agent, and some remain unreacted or crosslink in the molecule, whereby there is a problem that the heat resistance does not improve so much.

By controlling p and q, a cured product excellent in high elastic modulus, high heat resistance, and low water absorption property can be obtained from the epoxy resin according to the present embodiment. The bending elastic modulus is preferably 2.4 GPa to 3.5 GPa, more preferably 2.5 GPa to 3.3 GPa, still more preferably 2.5 GPa to 3.0 GPa, and particularly preferably 2.5 GPa to 2.9 GPa. When the bending elastic modulus is less than 2.4 GPa, the mechanical strength of the carbon fiber reinforced composite material is not sufficient and the reliability is lowered, which is not preferred. In addition, when the bending elastic modulus is more than 3.5 GPa, the material is easily broken because of being hard and brittle, and the reliability is lowered, which is not preferred.

The heat resistance (Tg) is preferably 180° C. to 300° C., more preferably 200° C. to 270° C., still more preferably 210° C. to 250° C., and particularly preferably 220° C. to 250° C. When the heat resistance is lower than 180° C., it is difficult to adapt to members that require heat resistance such as those around the engine of an aircraft, the resin softens during use, the mechanical strength is extremely lowered, and the material is damaged, which is not preferred. In addition, the heat resistance of the epoxy resin is generally correlated with the crosslink density, and the higher the crosslink density, the higher the heat resistance. That is, when the heat resistance is higher than 300° C., the crosslink density is increased and the mechanical strength of the cured product is decreased, which is not preferred.

The water absorption rate is preferably 0.5% to 1.5%, more preferably 0.7% to 1.3%, and particularly preferably 0.9% to 1.1%. The lower the water absorption rate, the more preferable. However, when the water absorption rate is less than 0.5%, the cured product becomes rigid and brittle, which is not preferred. In addition, when the water absorption rate is more than 1.5%, the cured product adsorbs water, which remarkably softens the material and lowers the mechanical strength, which is not preferred.

The epoxy resin represented by the formula (1) can be obtained by the reaction of a phenol resin represented by the following formula (4) with epihalohydrin.

[Chem. 10]

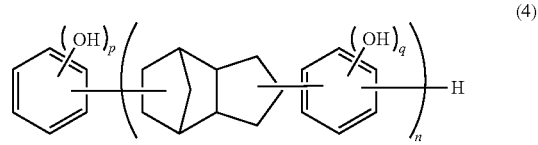

(4)

In the formula (4), p and q are present independently of each other and each represents a real number of 1 or 2, and n represents a real number of 1 to 20.

The preferred ranges of n, p, and q in the formula (4) are the same as those in the formula (1).

As a method for synthesizing the phenol resin represented by the above formula (4), when the reaction (condensation) between dicyclopentadiene and phenols is carried out, the amount of phenols is preferably in the range of 3 mol to 20 mol, and particularly preferably 5 mol to 15 mol with respect to 1 mol of dicyclopentadiene.

Examples of the phenols include catechol, resorcinol, and hydroquinone as disubstituted phenol, and phenol as monosubstituted phenol, which may be used alone or in combination of two or more thereof.

In the above condensation reaction, it is preferable to use an acid catalyst, and as the acid catalyst, Lewis acids such as boron trifluoride, anhydrous aluminum chloride, zinc chloride, sulfuric acid, and titanium chloride are preferred, and an ether complex and a phenol complex of the above Lewis acids are preferred. These acid catalysts may be used alone or in combination of two or more thereof.

The amount of these acid catalysts used is not particularly limited, and can be selected in the range of 0.001 mol to 0.1 mol with respect to the amount of dicyclopentadiene used. When added to the reaction system, these acid catalysts can be added to a heated melt of phenols in advance or diluted with an appropriate solvent and gradually added.

The condensation reaction in the presence of these acid catalysts is preferably carried out in the range of 40° C. to 180° C., and particularly preferably in the range of 80° C. to 165° C., and the reaction time can usually be selected in the range of 0.5 to 10 hours. In addition, the reaction can also be carried out in the presence of a solvent inert to the reaction such as nitrobenzene, diphenyl ether, dichlorobenzene, and carbon disulfide. Further, the obtained reaction product is neutralized such that the inside of the system is neutral, or washed with water in the presence of a solvent, then water is separated and drained, and then the solvent and unreacted substances are removed under a reduced pressure while heating, to give the phenol resin represented by the formula (4).

A preferred range of the hydroxyl group equivalent of the phenol resin represented by the formula (4) is 120 g/eq. or more and less than 160 g/eq., more preferably 135 g/eq. or more and less than 160 g/eq., still more preferably 140 g/eq. or more and less than 160 g/eq., and particularly preferably 145 g/eq. or more and less than 155 g/eq. When the hydroxyl group equivalent is less than 120 g/eq., that is, when the concentration of hydroxy groups in the phenol resin represented by the above formula (4) is high, the crosslink density increases, which makes the resin hard and brittle and causes a decrease in mechanical strength, which is not preferred. In addition, the hydroxy group generated by the ring-opening of the epoxy group deteriorates the water absorption property of the cured product, which is not preferred. When the hydroxyl group equivalent is 160 g/eq. or more, the heat resistance of the cured product of the epoxy resin obtained by the reaction with epichlorohydrin is lowered, which is not preferred. When the hydroxyl group equivalent is appropriate, the heat resistance of the cured product can be improved without causing a decrease in mechanical strength.

The softening point of the phenol resin represented by the formula (4) is preferably in the range of 90° C. to 140° C., and more preferably in the range of 100° C. to 130° C. When the softening point is within the above range, the resins do not block each other at room temperature, so that the handling property is excellent.

Next, the reaction for obtaining the epoxy resin according to the present embodiment will be described.

The epoxy resin according to the present embodiment is obtained, for example, by reacting the phenol resin represented by the formula (4) with epihalohydrin.

The epihalohydrin is easily available on the market. The amount of epihalohydrin to be used is usually 4.0 mol to 10 mol, preferably 4.5 mol to 8.0 mol, and more preferably 5.0 mol to 7.0 mol, with respect to 1 mol of the hydroxy group in a raw material phenol mixture. During epoxidation, it is common that the produced epoxy resin reacts with a phenolic hydroxy group, which is an unreacted component, to produce an epoxy resin having a glycerin ether moiety. It is preferable that there are many glycerin ether moieties since the toughness of the epoxy resin cured product is increased. On the other hand, it is not preferable that the amount of the glycerin ether moiety is large since the handling property is lowered due to an increase in melt viscosity caused by an increase in molecular weight of the epoxy resin and the water absorption rate of the epoxy resin cured product is increased, and it is necessary to use the amount of epihalohydrin according to the design. It is preferable to use epihalohydrin excessively with respect to the hydroxy group in the raw material phenol resin since the intermolecular reaction during epoxidation can be prevented and a low viscosity epoxy resin can be obtained.

In the above reaction, an alkali metal hydroxide can be used as a catalyst to accelerate the epoxidation step. Examples of the alkali metal hydroxide that can be used include sodium hydroxide and potassium hydroxide. A solid substance may be used, or an aqueous solution thereof may be used. In the present embodiment, it is particularly preferable to use a solid material molded into flakes in terms of solubility and handling.

The amount of the alkali metal hydroxide to be used is usually 0.90 mol to 1.5 mol, preferably 0.95 mol to 1.25 mol, and more preferably 0.99 to 1.15 mol with respect to 1 mol of the hydroxy group in the raw material phenol mixture.

In addition, in order to accelerate the reaction, a quaternary ammonium salt such as tetramethylammonium chloride, tetramethylammonium bromide, or trimethylbenzylammonium chloride may be added as a catalyst. The amount of the quaternary ammonium salt to be used is usually 0.1 g to 15 g, and preferably 0.2 g to 10 g, with respect to 1 mol of the hydroxy group in the raw material phenol mixture.

The reaction temperature is usually 30° C. to 90° C., and preferably 35° C. to 80° C. In particular, in the present embodiment, 50° C. or higher is preferred, and 60° C. or higher is particularly preferred for epoxidation with a higher purity. The reaction time is usually 0.5 to 10 hours, preferably 1 to 8 hours, and particularly preferably 1 to 3 hours. When the reaction time is short, the reaction does not proceed completely, and when the reaction time is long, by-products are formed, which is not preferred.

After washing the reaction products of the epoxidation reaction with water or without washing with water, epihalohydrin, a solvent and the like are removed under heating and reduced pressure. In order to obtain an epoxy resin with less hydrolyzable halogen, the recovered epoxy resin is dissolved in a ketone compound having 4 to 7 carbon atoms (for example, methyl isobutyl ketone, methyl ethyl ketone, cyclopentanone, or cyclohexanone) as a solvent, an aqueous solution of an alkali metal hydroxide such as sodium hydroxide or potassium hydroxide is added to carry out the reaction, and ring closure can be ensured. In this case, the amount of the alkali metal hydroxide to be used is usually 0.01 mol to 0.3 mol, and preferably 0.05 mol to 0.2 mol, with respect to 1 mol of the hydroxy group in the raw material phenol mixture used for epoxidation. The reaction temperature is usually 50° C. to 120° C., and the reaction time is usually 0.5 to 2 hours.

After completion of the reaction, the produced salt is removed by filtration, washing with water, or the like, and the solvent is further distilled off under heating and reduced pressure to give the epoxy resin according to the present embodiment.

An epoxy resin composition according to the present embodiment contains a curing agent. Examples of the curing agent that can be used include an amine-based curing agent, an acid anhydride-based curing agent, an amide-based curing agent, and a phenol-based curing agent.

In the epoxy resin composition according to the present embodiment, an amine-based curing agent is particularly preferred since the resin viscosity of the epoxy resin composition and the heat resistance of the resin cured product can be achieved in a well-balanced manner. As the amine-based curing agent, 3,3'-diaminodiphenyl sulfone (3,3'-DDS), 4,4'-diaminodiphenyl sulfone (4,4'-DDS), diaminodiphenylmethane (DDM), 3,3'-diisopropyl-4,4'-diaminodiphenylmethane, 3,3'-di-t-butyl-4,4'- diaminodiphenylmethane, 3,3'-diethyl-5,5'-dimethyl-4,4'-diaminodiphenylmethane, 3,3'-diisopropyl-5,5'-dimethyl-4,4'-diaminodiphenylmethane, 3,3'-di-t-butyl-5,5'-dimethyl-4,4'-diaminodiphenylmethane, 3,3',5,5'-tetraethyl-4,4'-diaminodiphenylmethane, 3,3'-diisopropyl-5,5'-diethyl-4,4'-diaminodiphenylmethane, 3,3'-di-t-butyl-5,5'-diethyl-4,4'-diaminodiphenylmethane, 3,3',5,5'-tetraisopropyl-4,4'-diaminodiphenylmethane, 3,3'-di-t-butyl-5,5'-diisopropyl-4,4'-diaminodiphenylmethane, 3,3', 5,5'-tetra-t-butyl-4,4'-diaminodiphenylmethane, diaminodiphenyl ether (DADPE), bisaniline, benzyldimethylaniline, 2-(dimethylaminomethyl) phenol (DMP-10), 2,4,6-tris(dimethylaminomethyl) phenol (DMP-30), and 2-ethylhexanoic acid ester of 2,4,6-tris(dimethylaminomethyl) phenol can be used. Examples thereof further include aniline novolac, orthoethylaniline novolac, aniline resins obtained by the reaction of aniline and xylylene chloride, and aniline resins obtained by polycondensation of aniline with substituted biphenyls (such as 4,4'-bis(chloromethyl)-1,1'-biphenyl and 4,4'-bis(methoxymethyl)-1,1'-biphenyl), or with substituted phenyls (such as 1,4-bis(chloromethyl)benzene, 1,4-bis(methoxymethyl)benzene, and 1,4-bis(hydroxymethyl)benzene).

Examples of the acid anhydride-based curing agent include phthalic anhydride, trimellitic anhydride, pyromellitic anhydride, maleic anhydride, tetrahydrophthalic anhydride, methyltetrahydrophthalic anhydride, methylnadic anhydride, hexahydrophthalic anhydride, and methylhexahydrophthalic anhydride.

Examples of the amide-based curing agent include dicyandiamide or a polyamide resin synthesized from linolenic acid dimer and ethylenediamine.

Examples of the phenol-based curing agent include: polyphenols (such as bisphenol A, bisphenol F, bisphenol S, fluorene bisphenol, terpendiphenol, 4,4'-dihydroxybiphenyl, 2,2'-dihydroxybiphenyl, 3,3',5,5'-tetramethyl-(1,1'-biphenyl)-4,4'-diol, hydroquinone, resorcin, naphthalenediol, tris-(4-hydroxyphenyl)methane and 1,1,2,2-tetrakis(4-hydroxyphenyl) ethane); phenol resins obtained by condensation of phenols (such as phenol, alkyl substituted phenol, naphthol, alkyl substituted naphthol, dihydroxybenzene, and dihydroxynaphthalene) with aldehydes (such as formaldehyde, acetaldehyde, benzaldehyde, p-hydroxybenzaldehyde, o-hydroxybenzaldehyde, and furfural), ketones (such as p-hydroxyacetophenone and o-hydroxyacetophenone), or dienes (such as dicyclopentadiene and tricyclopentadiene); phenol resins obtained by polycondensation of the above phenols with substituted biphenyls (such as 4,4'-bis(chloromethyl)-1,1'-biphenyl and 4,4'-bis(methoxymethyl)-1,1'-biphenyl), or substituted phenyls (such as 1,4-bis(chloromethyl)benzene, 1,4-bis(methoxymethyl)benzene, and 1,4-bis(hydroxymethyl)benzene); modified products of the above phenols and/or the above phenol resins; and halogenated phenols such as tetrabromobisphenol A and a brominated phenol resin.

In the epoxy resin composition according to the present embodiment, the amount of the curing agent to be used is preferably 0.7 to 1.2 equivalents with respect to 1 equivalent of the epoxy group in the epoxy resin. When the amount is less than 0.7 equivalents with respect to 1 equivalent of the epoxy group, or is more than 1.2 equivalents, curing may be incomplete and good cured physical properties may not be obtained.

In addition, in the epoxy resin composition according to the present embodiment, a curing accelerator may be added, if necessary. When the curing accelerator is used, the gelling time can be adjusted. Examples of the curing accelerator that can be used include imidazoles such as 2-methylimidazole, 2-ethylimidazole, and 2-ethyl-4-methylimidazole, tertiary amines such as 2-(dimethylaminomethyl) phenol and 1,8-diaza-bicyclo[5,4,0]undecene-7, phosphines such as triphenylphosphine, and metal compounds such as tin octylate. The curing accelerator is used as necessary in an amount of 0.01 to 5.0 parts by weight with respect to 100 parts by weight of the epoxy resin.

In the epoxy resin composition according to the present embodiment, other epoxy resins may be blended. Specific examples thereof include: polycondensates of phenols (such as phenol, alkyl substituted phenol, aromatic substituted phenol, naphthol, alkyl substituted naphthol, dihydroxybenzene, alkyl substituted dihydroxybenzene, and dihydroxynaphthalene) with various aldehydes (such as formaldehyde, acetaldehyde, alkylaldehyde, benzaldehyde, alkyl substituted benzaldehyde, hydroxybenzaldehyde, naphthoaldehyde, glutaraldehyde, phthalaldehyde, crotonaldehyde, and cinnamaldehyde); polymers of phenols with various diene compounds (such as dicyclopentadiene, terpenes, vinylcyclohexene, norbornadiene, vinylnorbornene, tetrahydroindene, divinylbenzene, divinylbiphenyl, diisopropenylbiphenyl, butadiene, and isoprene); polycondensates of phenols with ketones (such as acetone, methyl ethyl ketone, methyl isobutyl ketone, acetophenone, and benzophenone); phenol resins obtained by polycondensation of phenols with substituted biphenyls (such as 4,4'-bis(chloromethyl)-1,1'-biphenyl and 4,4'-bis(methoxymethyl)-1,1'-biphenyl), or substituted phenyls (such as 1,4-bis(chloromethyl)benzene, 1,4-bis(methoxymethyl)benzene, and 1,4-bis(hydroxymethyl)benzene); polycondensates of bisphenols with various aldehydes; glycidyl ether-based epoxy resins obtained by glycidylizing alcohols; alicyclic epoxy resins typified by 4-vinyl-1-cyclohexene epoxide and 3,4-epoxycyclohexylmethyl-3,4'-epoxycyclohexanecarboxylate; glycidylamine-based epoxy resins represented by tetraglycidyldiaminodiphenylmethane (TGDDM) and triglycidyl-p-aminophenol; and glycidylester-based epoxy resins. The epoxy resin is not limited to these as long as it is a commonly used epoxy resin.

A known additive can be added to the epoxy resin composition according to the present embodiment, if necessary. Specific examples of the additive that can be used include polybutadiene and modified products thereof, modified products of an acrylonitrile copolymer, polyphenylene ether, polystyrene, polyethylene, polyimide, fluororesin, a maleimide-based compound, a cyanate ester-based compound, silicone gel, silicone oil, inorganic fillers such as silica, alumina, calcium carbonate, quartz powder, aluminum powder, graphite, talc, clay, iron oxide, titanium oxide, aluminum nitride, asbestos, mica, and glass powder, surface treatment agents for fillers such as a silane coupling agent, a release agent, and colorants such as carbon black, phthalocyanine blue, and phthalocyanine green.

A known maleimide-based compound can be added to the epoxy resin composition according to the present embodiment, if Specific examples of the maleimide-based compound necessary. that can be used include but not limited to 4,4'-diphenylmethane bismaleimide, polyphenylmethane maleimide, m-phenylene bismaleimide, 2,2'-bis [4-(4-maleimidephenoxy)phenyl]propane, 3,3'-dimethyl-5,5'-diethyl-4,4'-diphenylmethane bismaleimide, 4-methyl-1,3-phenylene bismaleimide, 4,4'-diphenyl ether bismaleimide, 4,4'-diphenyl sulfone bismaleimide, 1,3-bis(3-maleimidephenoxy)benzene, 1,3-bis(4-maleimidephenoxy) benzene, and biphenyl aralkyl-type maleimide. One of these may be used alone, or two or more kinds thereof may be used in combination. When the maleimide-based compound is added, a curing accelerator is added if necessary, and the curing accelerator, a radical polymerization initiator such as an organic oxide or an azo compound, or the like can be used.

The epoxy resin composition according to the present embodiment can be made into a varnish-like composition (hereinafter, simply referred to as varnish) by adding an organic solvent. Examples of the solvent to be used include amide solvents such as γ-butyrolactone, amide solvents such as N-methylpyrrolidone, N,N-dimethylformamide, N,N-dimethylacetamide, and N,N-dimethylimidazolidinone, sulfones such as tetramethylene sulfone, ether solvents such as diethylene glycol dimethyl ether, diethylene glycol diethyl ether, propylene glycol, propylene glycol monomethyl ether, propylene glycol monomethyl ether monoacetate, and propylene glycol monobutyl ether, ketone solvents such as methyl ethyl ketone, methyl isobutyl ketone, cyclopentanone, and cyclohexanone, and aromatic solvents such as toluene and xylene. The solvent is used in a range in which the solid content concentration of the obtained varnish excluding the solvent is usually 10 wt % to 80 wt %, and preferably 20 wt % to 70 wt %.

Next, a resin sheet, a prepreg, and a carbon fiber reinforced composite material according to the present embodiment will be described.

The epoxy resin composition according to the present embodiment may be applied to one side or both sides of a supporting base material and used as a resin sheet. Examples of the coating method include a casting method, a method of extruding a resin from a nozzle or a die by a pump or an extruder and adjusting the thickness with a blade, a method of calendar processing with a roll and adjusting the thickness, and a method of spraying using a spray or the like. In the step of forming a layer, the epoxy resin composition may be heated in a temperature range in which thermal decomposition can be avoided. In addition, a rolling treatment, a grinding treatment and the like may be performed as necessary. Examples of the supporting base material include but not limited to porous base material made of paper, cloth, and non-woven fabric, and appropriate thin leaf bodies such as plastic film or sheet such as polyethylene, polypropylene, polyethylene terephthalate, and polyester film, nets, foams, metal foils, and laminates of the above. The thickness of the supporting base material is not particularly limited, and is appropriately determined according to the intended use.

The prepreg according to the present embodiment can be obtained by heating and melting the epoxy resin composition and/or the resin sheet according to the present embodiment to reduce the viscosity and impregnating a fiber base material with the above substance.

In addition, the prepreg according to the present embodiment can also be obtained by impregnating a fiber base material with a varnish-like epoxy resin composition and performing heating and drying. The above prepreg is cut into a desired shape and laminated, and then the epoxy resin composition is heat-cured while applying a pressure to the laminate by a press molding method, an autoclave molding method, a sheet winding molding method, or the like, to thereby obtain the carbon fiber reinforced composite material according to the present embodiment. In addition, a copper foil or an organic film can be laminated when laminating the prepreg.

Further, for a method for molding the carbon fiber reinforced composite material according to the present embodiment, molding by using a known method in addition to the above method can be used. For example, a resin transfer molding method (RTM method) can be used, in which a carbon fiber base material (usually a carbon fiber woven fabric) is cut, laminated, and shaped to prepare a preform (preformed body before impregnation with a resin), the preform is arranged in a mold, the mold is closed, a resin is injected, the preform is impregnated and cured, and then the mold is open to take out the molded product.

In addition, for example, a VaRTM method which is a kind of the RTM method, a Seeman's composite resin infusion molding process (SCRIMP), and a controlled atmospheric pressure resin infusion (CAPRI) method descried in JP-B-2005-527410 can also be used. In the CAPRI method, the resin injection process, particularly the VaRTM method is more appropriately controlled by evacuating a resin supply tank to a pressure below the atmospheric pressure, using circulating compression, and controlling the net molding pressure.

Further, a film stacking method of sandwiching a fiber base material between resin sheets (films), a method of adhering a powdery resin to a reinforcing fiber base material to improve impregnation, a molding method using a fluidized bed or fluid slurry method in the process of mixing a resin with a fiber base material (powder impregnated yarn), and a method of mixing a resin fiber with a fiber base material can also be used.

Examples of the carbon fiber include acrylic, pitch, rayon and other carbon fibers. Among these, an acrylic carbon fiber having high tensile strength is preferably used. As the form of the carbon fiber, a twisted yarn, an untwisted yarn, non-twisted yarn and the like can be used. An untwisted yarn or non-twisted yarn is preferably used because of a good balance between moldability and strength characteristics of the fiber reinforced composite material.

EXAMPLES

Hereinafter, the present invention will be described in more detail with reference to Synthesis Examples and Examples. The materials, treatment contents, treatment procedures, etc. shown below can be appropriately changed as long as they do not deviate from the gist of the present invention. Therefore, the scope of the present invention should not be construed as being limited by the specific Examples shown below.

Various analysis methods used in Examples will be described below.

Various analysis methods were performed under the following conditions.

Epoxy Equivalent

The epoxy equivalent is measured by the method described in JIS K-7236, and the unit is g/eq.

Softening Point

The softening point is measured by a method conforming to JIS K-7234, and the unit is ° C.

Melt Viscosity

The ICI melt viscosity (150° C.) is measured by the cone-plate method, and the unit is Pa·s.

Hydroxyl Group Equivalent

The hydroxyl group equivalent is measured by the following method, and the unit is g/eq.

A phenol resin is reacted with excess acetic anhydride and titrated with a 0.5N KOH ethanol solution using a potentiometric device to measure the amount of free acetic acid.

Reagent: acetic anhydride, triphenylphosphine, and pyridine

Solvent: tetrahydrofuran and propylene glycol monomethyl ether

Automatic titration device: COM-1600 manufactured by HIRANUMA Co., Ltd.

Burette: B-2000 manufactured by HIRANUMA Co., Ltd.
Gel Permeation Chromatography (GPC) Analysis
  Manufacturer: Waters
  Column: Guard column SHODEX GPC KF-601 (2), KF-602, KF-602.5, KF-603
  Flow rate: 1.23 ml/min.
  Column temperature: 25° C.
  Solvent used: tetrahydrofuran (THF)
  Detector: differential refractometer (RI)
High Performance Liquid Chromatography Analysis
  Liquid transfer unit LC-20AD manufactured by Shimadzu Corporation
  Photodiode array detector SPD-M20A manufactured by Shimadzu Corporation
  Column oven CTO-20A manufactured by Shimadzu Corporation
  Column: Intersil ODS-2, 5 μm, 4.6×250 mm, 40° C.
  Mobile Phase A: acetonitrile (AN)
  Mobile Phase B: water (W)
  Time Program:
    0 to 28 min. AN/W=30%/70%→100%/0%
    28 to 40 min. AN/W=100%/0%
  Flow rate: 1.0 mL/min.
  Detection: UV 274 nm, PDA Synthesis Example 1

To a four-necked flask equipped with a thermometer, a stirrer, a dropping funnel, and a cooler, 1035 parts (11 mol) of phenol, 88 parts (0.8 mol) of resorcinol, and 65 parts (0.7 mol) of toluene were charged, and azeotropic dehydration was performed at 170° C. for 2 hours while purging with nitrogen gas.

Next, the oil bath was cooled to 100° C., and 2.1 parts (0.01 mol) of a boron trifluoride diphenol complex was added when the internal temperature was stable at 100° C. Further, 112 parts (0.8 mol) of dicyclopentadiene was added over 3 hours using a dropping funnel and the reaction was carried out. After completion of the dropping, the reaction was further carried out at 120° C. for 2 hours and at 145° C. for 3 hours. After completion of the reaction, 6 parts of sodium tripolyphosphate and 555 parts of methyl isobutyl ketone were added and stirred, warm water was added, and washing with water was repeated to neutralize the inside of the system. Thereafter, the solvent was distilled off from the oil layer at 180° C. using an evaporator to give 250 parts of a phenol resin P-1. The obtained resin had a softening point of 109° C., and a hydroxyl group equivalent of 152 g/eq. The high performance liquid chromatograph chart of the obtained phenol resin is shown in FIG. 1. In the n=1 component of the phenol resin, a component in which both p and q are 2 is detected to have a peak at 12 to 16 minutes, a component in which one of p and q is 1 and the other is 2 is detected to have a peak at 16 to 21 minutes, and a component in which both p and q are 1 is detected to have a peak at 21 to 25 minutes. The ratio of the component in which one of p and q was 1 and the other was 2 in the total amount of the phenol resin was 15.8%.

Synthesis Example 2

Figure 2:
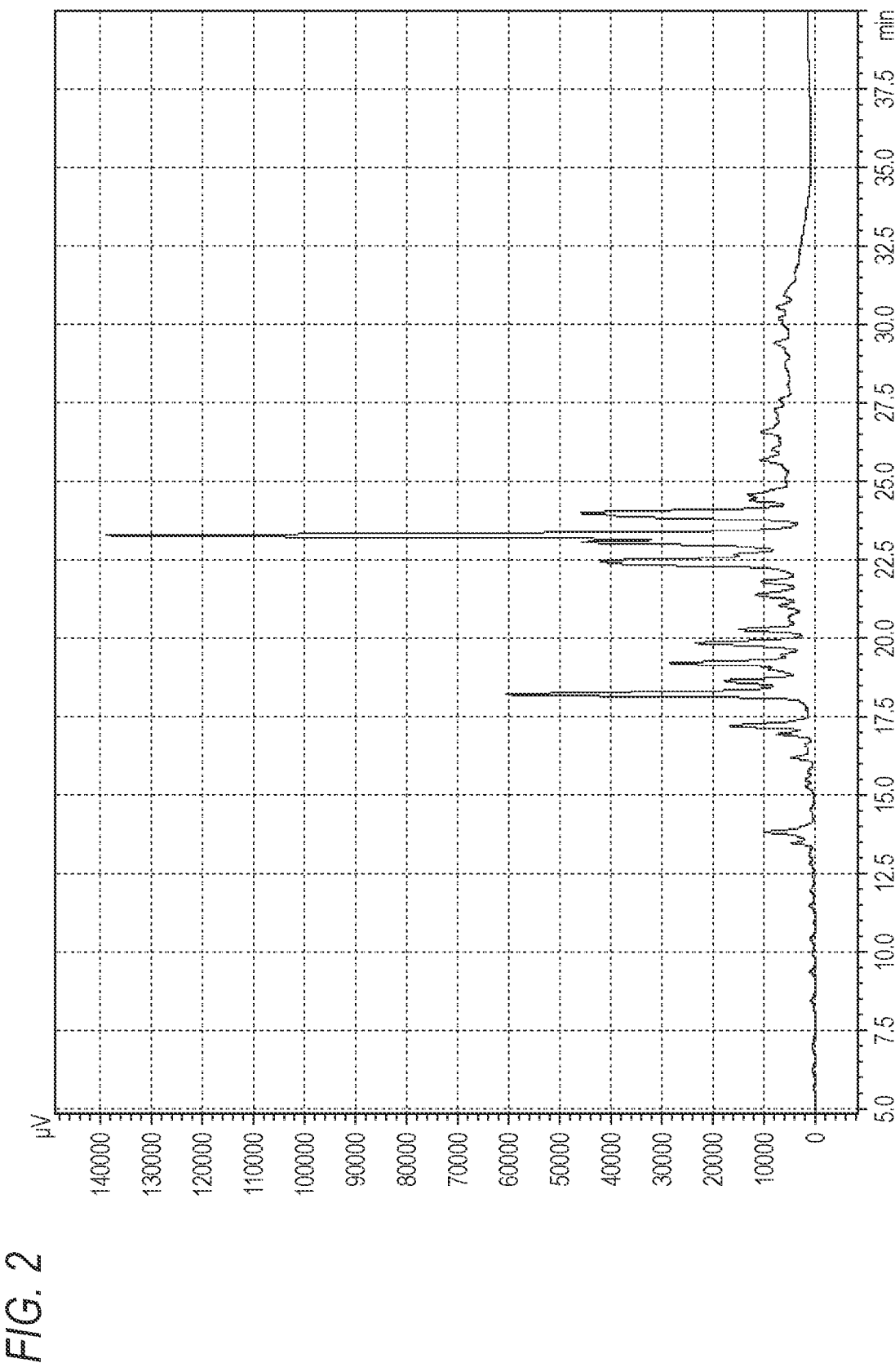
FIG. 2 is a high performance liquid chromatograph chart of Synthesis Example 2.

245 parts of a phenol resin P-2 was obtained by carrying out a reaction in the same manner as in Example 1, except that resorcinol was 231 parts (2.1 mol). The obtained resin had a softening point of 120° C., and a hydroxyl group equivalent of 140 g/eq. The high performance liquid chromatograph chart of the obtained phenol resin is shown in FIG. 2. The ratio of the component in which one of p and q was 1 and the other was 2 in the total amount of the n=1 component in the phenol resin was 29.7%.

Synthesis Example 3

Figure 3:
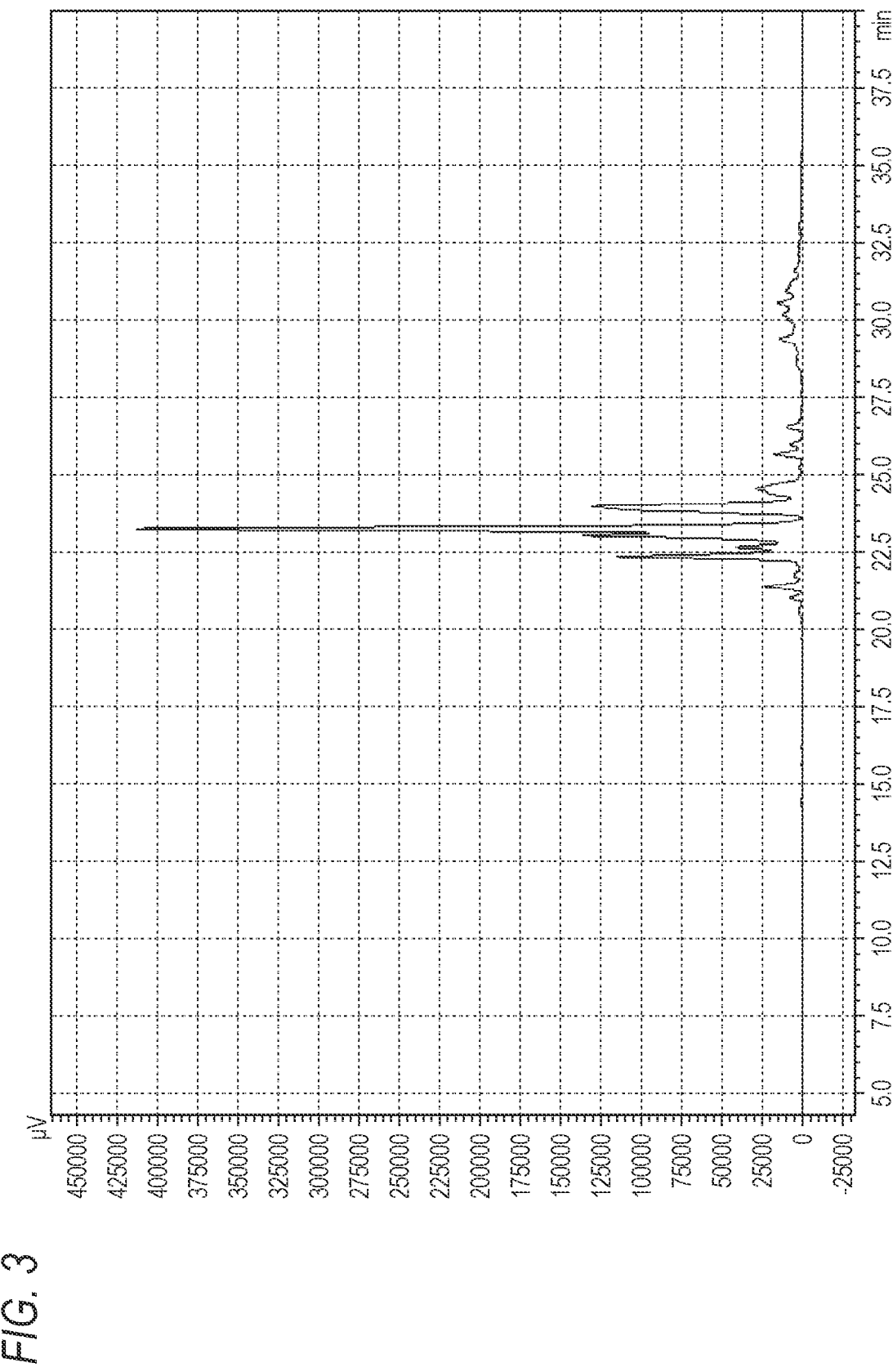
FIG. 3 is a high performance liquid chromatograph chart of Synthesis Example 3.

240 parts of a phenol resin P-3 was obtained by carrying out a reaction in the same manner as in Example 1, except that resorcinol was not added. The obtained resin had a softening point of 86° C., and a hydroxyl group equivalent of 165 g/eq. The high performance liquid chromatograph chart of the obtained phenol resin is shown in FIG. 3. The ratio of the component in which one of p and q was 1 and the other was 2 in the total amount of the n=1 component in the phenol resin was 0.0%.

Example 1

Figure 4:
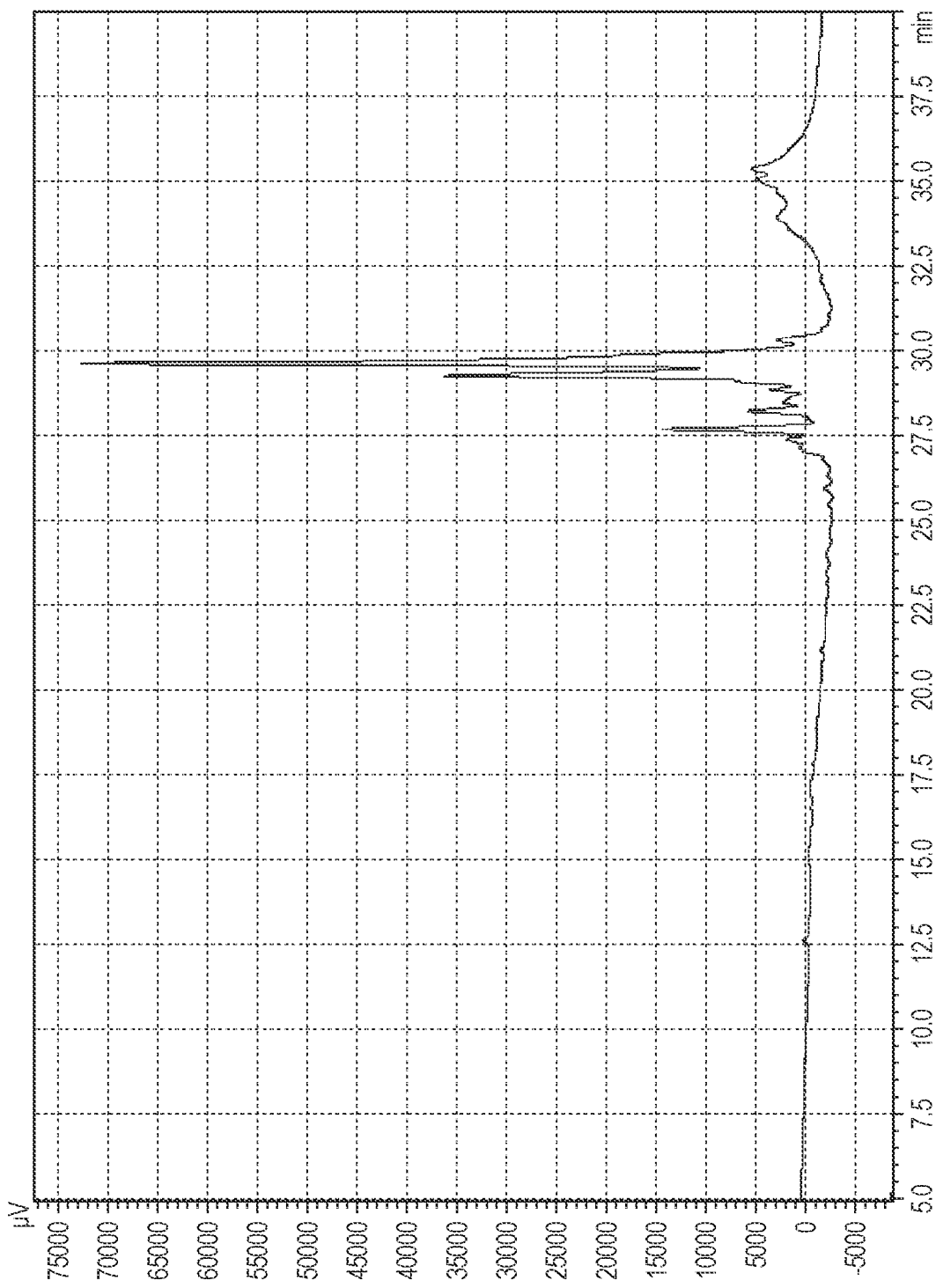
FIG. 4 is a high performance liquid chromatograph chart of Example 1.
Figure 7:
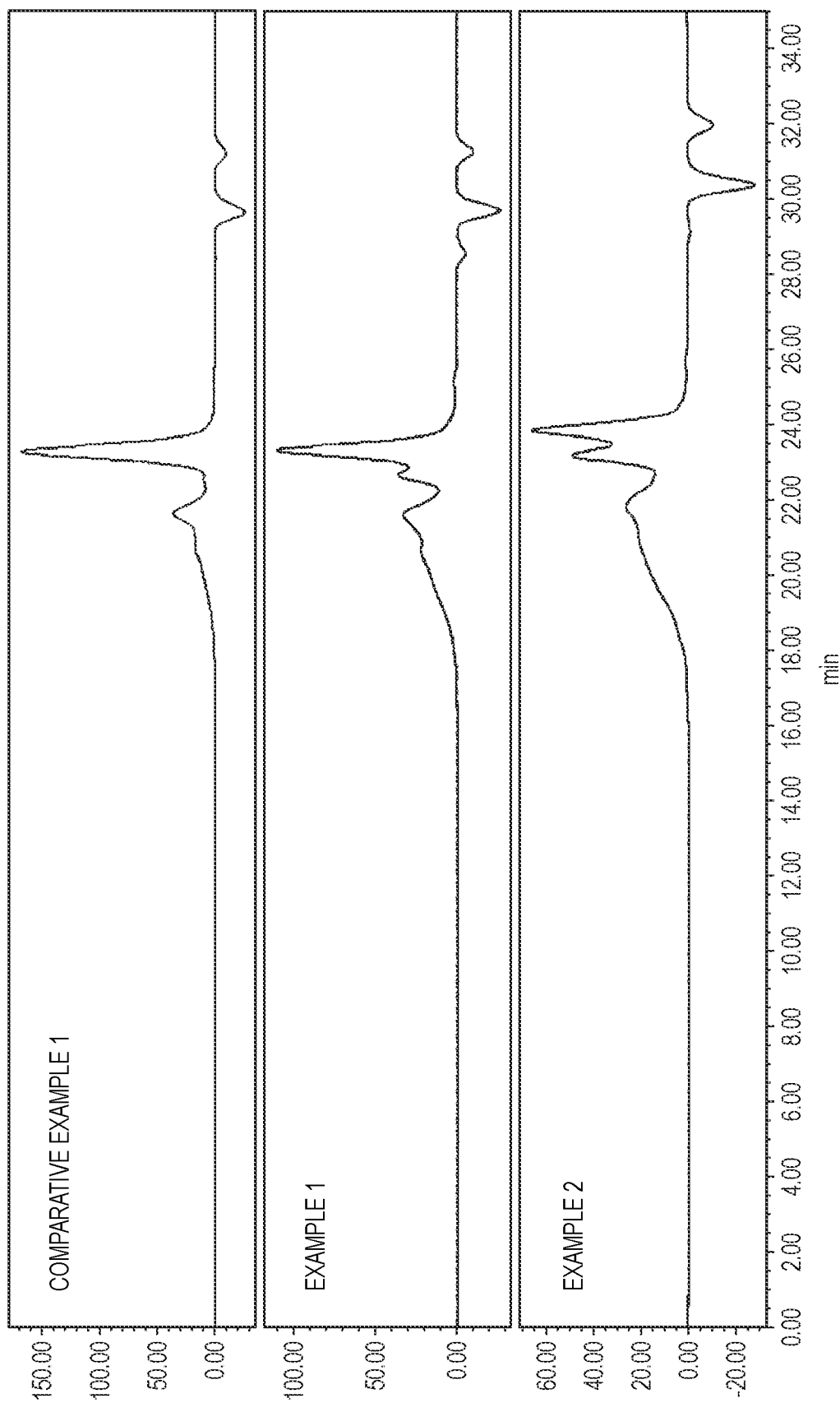
FIG. 7 is GPC charts of Examples 1 and 2 and Comparative Example 1.

To a four-necked flask equipped with a stirrer and a reflux condenser, 228 parts of the phenol resin P-1 obtained in Synthesis Example 1, 555 parts of epichlorohydrin, 139 parts of dimethyl sulfoxide, and 22 parts of water were added while purging with nitrogen, and the water bath was heated to 65° C. When the internal temperature was stable at 65° C., 63 parts of flake-shaped sodium hydroxide was added in portions over 90 minutes, and then the reaction was further carried out at 65° C. for 2 hours and 70° C. for 1 hour. After completion of the reaction, washing with water was performed, and the excess solvent such as epichlorohydrin was distilled off from the oil layer under reduced pressure at 125° C. using a rotary evaporator. 720 parts of methyl isobutyl ketone was added to the residue to dissolve the residue, and the temperature was raised to 75° C. 18 parts of a 30 wt % sodium hydroxide aqueous solution was added under stirring, and the reaction was carried out for 1 hour, followed by washing with water, and it was confirmed with pH test paper that the washing water was neutral. Methyl isobutyl ketone and the like were distilled off from the obtained solution under a reduced pressure at 180° C. using a rotary evaporator, to give 295 parts of an epoxy resin (EP1). The obtained epoxy resin had an epoxy equivalent of 226 g/eq., a softening point of 63° C., and an ICI melt viscosity of 0.08 Pa·s (150° C.). The physical properties of the resin are shown in Table 1. In Table 1, the area % in column A is GPC area %, the area % in column B is HPLC area %, and the area % in column C is the product of the GPC area % and the HPLC area %. The high performance liquid chromatograph chart of the obtained epoxy resin is shown in FIG. 4, and the GPC chart thereof is shown in FIG. 7. In the n=1 component of the epoxy resin, a component in which both p and q are 2 is detected to have a peak at 24.5 to 26.5 minutes, a component in which one of p and q is 1 and the other is 2 is detected to have a peak at 26.5 to 28.5 minutes, and a component in which both p and q are 1 is detected to have a peak at 28.5 to 31 minutes. The ratio of the component in which one of p and q was 1 and the other was 2 in the total amount of the n=1 component in the epoxy resin was 13.1%.

Example 2

Figure 5:
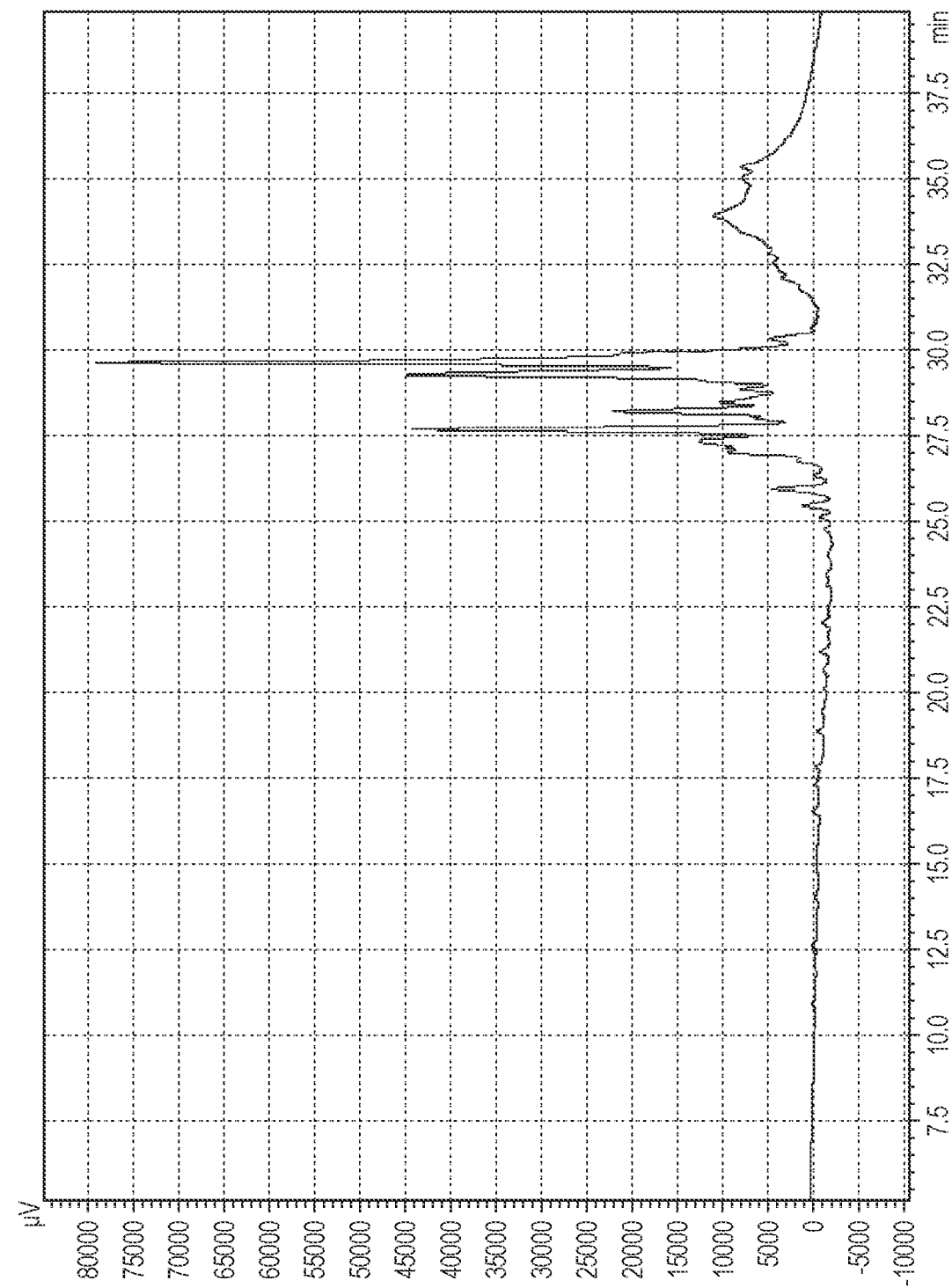
FIG. 5 is a high performance liquid chromatograph chart of Example 2.

282 parts of an epoxy resin (EP2) was obtained in the same manner as in Example 1, except that the phenol resin was changed to 209 parts of the phenol resin P-2 obtained in Synthesis Example 2. The obtained epoxy resin had an epoxy equivalent of 215 g/eq., a softening point of 70° C., and an ICI melt viscosity of 0.17 Pa·s (150° C.). The physical properties of the resin are shown in Table 1. The high performance liquid chromatograph chart of the obtained epoxy resin is shown in FIG. 5, and the GPC chart thereof is shown in FIG. 7. The ratio of the component in which one of p and q was 1 and the other was 2 in the total amount of the n=1 component in the epoxy resin was 24.8%.

Comparative Example 1

Figure 6:
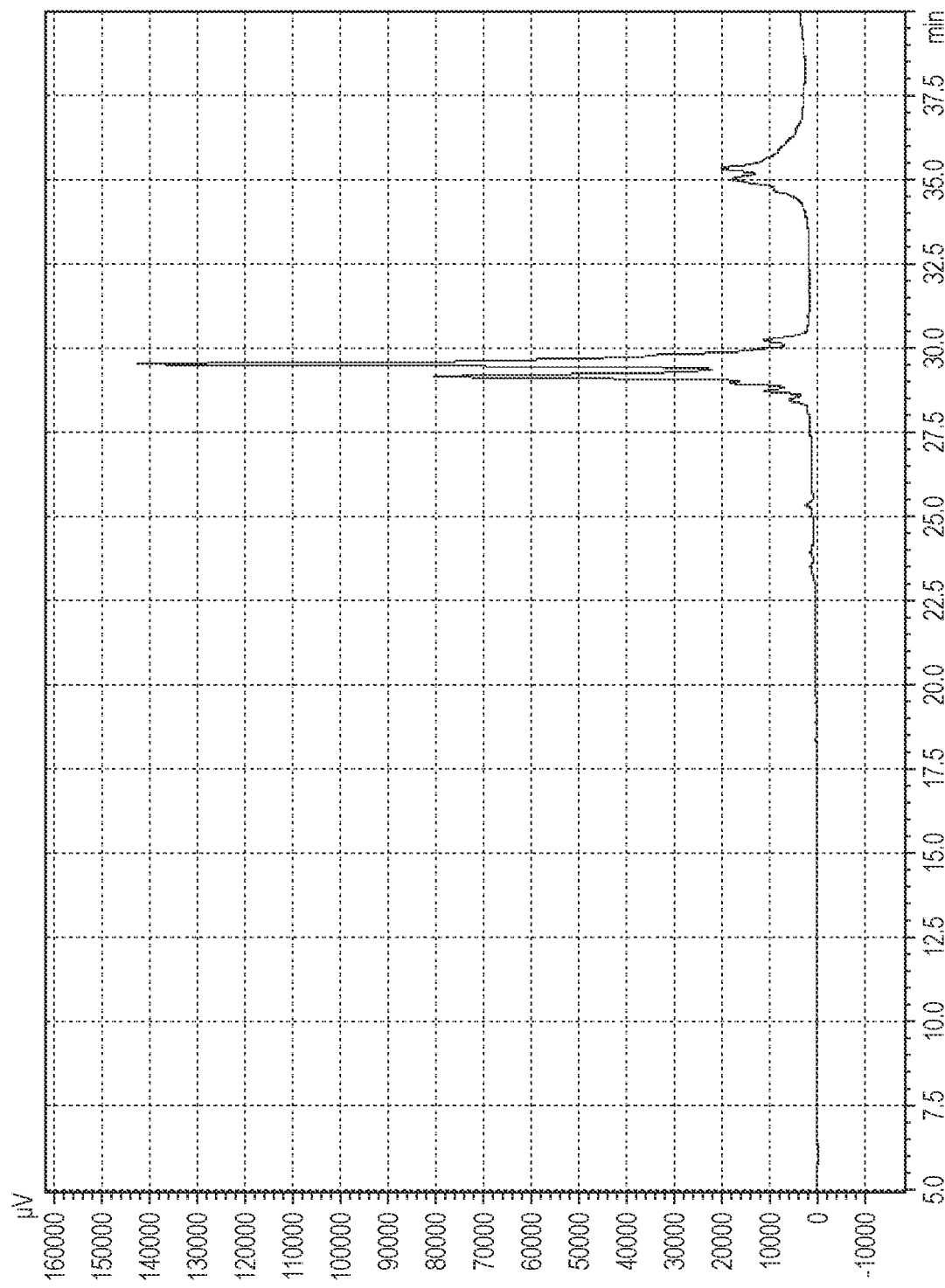
FIG. 6 is a high performance liquid chromatograph chart of Comparative Example 1.

275 parts of an epoxy resin (EP3) was obtained in the same manner as in Example 1, except that the phenol resin was changed to 200 parts of the phenol resin P-3 obtained in Synthesis Example 3. The obtained epoxy resin had an epoxy equivalent of 238 g/eq., a softening point of 55° C., and an ICI melt viscosity of 0.05 Pa·s (150° C.). The physical properties of the resin are shown in Table 1. The high performance liquid chromatograph chart of the obtained epoxy resin is shown in FIG. 6, and the GPC chart thereof is shown in FIG. 7. The ratio of the component in which one of p and q was 1 and the other was 2 in the total amount of the n=1 component in the epoxy resin was 0.0%.

TABLE 1

| | | Ratio (area %) of n = 1 component in total amount of resin A n = 1 | Ratio (area %) of each component in n = 1 component | | | Ratio (area %) of B2 in total amount of resin A × B2 |
|---|---|---|---|---|---|---|
| | | | B1 p = 2, q = 2 | B2 p = 1, q = 2 or p = 2, q = 1 | B3 p = 1, q = 1 | |
| Synthesis Example 1 | P-1 | 62.6 | 0.9 | 15.8 | 83.4 | 9.9 |
| Synthesis Example 2 | P-2 | 57.9 | 2.8 | 29.7 | 67.4 | 17.2 |
| Synthesis Example 3 | P-3 | 79.2 | 0.0 | 0.0 | 100.0 | 0.0 |
| Example 1 | EP1 | 51.3 | 0.6 | 13.1 | 86.3 | 6.7 |
| Example 2 | EP2 | 45.3 | 3.9 | 24.8 | 71.3 | 11.2 |
| Comparative Example 1 | EP3 | 61.6 | 0.0 | 0.0 | 100.0 | 0.0 |

Examples 3 and 4 and Comparative Examples 2 and 3

Each of the epoxy resins (EP1 and EP2) obtained in Examples 1 and 2, the epoxy resin (EP3) obtained in Comparative Example 1, and a bisphenol A type epoxy resin (jER828 manufactured by Mitsubishi Chemical Corporation) was used as a main agent, 3,3',5,5'-tetraethyl-4,4'-diaminodiphenylmethane (abbreviation; TEDDM, manufactured by Tokyo Chemical Industry Co., Ltd., active hydrogen equivalent: 78 g/eq.) was used as a curing agent, and the mixture was mixed at the weight ratio shown in the compounding composition in Table 2 and cured under curing conditions of 160° C. for 6 hours. The physical property data are shown in Table 2.

Example 5 and Comparative Examples 4 and 5

Each of the epoxy resin (EP1) obtained in Example 1, the epoxy resin (EP3) obtained in Comparative Example 1, and a bisphenol A type epoxy resin (jER828 manufactured by Mitsubishi Chemical Corporation) was used as a main agent, 4,4'-diaminodiphenyl sulfone (abbreviation; 4,4'-DDS, manufactured by Wakayama Seika Kogyo CO., Ltd., active hydrogen equivalent: 62 g/eq.) was used as a curing agent, triphenylphosphine (TPP) was used as a curing accelerator, and the mixture was mixed at the weight ratio shown in the compounding composition in Table 3 and cured under curing conditions of 160° C. for 2 hours and 180° C. for 6 hours. The physical property data are shown in Table 3.

Example 6 and Comparative Examples 6 and 7

Each of the epoxy resin (EP1) obtained in Example 1, the epoxy resin (EP3) obtained in Comparative Example 1, and an orthocresol novolac type epoxy resin EOCN-1020 (manufactured by Nippon Kayaku Co., Ltd., softening point: 55° C., ICI viscosity (150° C.): 0.05 Pa·s, epoxy equivalent: 194 g/eq.) was used as a main agent, phenol novolac (softening point: 83° C., hydroxyl group equivalent: 106 g/eq.) was used as a curing agent, triphenylphosphine (TPP) was used as a curing accelerator, and the mixture was mixed at the weight ratio shown in the compounding composition in Table 4 and cured under curing conditions of 160° C. for 2 hours and 180° C. for 6 hours. The physical property data are shown in Table 4.

Example 7 and Comparative Example 8

The formulations having the ratios shown in Table 5 were uniformly mixed with a mixing roll to obtain epoxy resin compositions. Each of the compositions was ground to give a tablet with a tablet machine. The obtained tablet was molded by a transfer molding machine, and a test piece having a size of 10×4×90 mm was formed. The test piece was heated at 160° C. for 2 hours and further at 180° C. for 8 hours for post-curing. The test piece was held vertically on a clamp, a flame of a burner was adjusted to a blue flame of 19 mm, and a flame of 9.5 mm was contacted with the center of the lower end of the test piece for 10 seconds. After contact with the flame, the burner was moved away, and a burning duration was measured. Immediately after extinguishing the flame, the test piece was brought into contact with the flame for 10 seconds, then the burner was moved away, and the burning duration was measured. Table 5 shows the total value of burning times for 10 times of each sample.

MEHC-7800SS: biphenyl aralkyl type phenol resin (manufactured by Meiwa Plastic Industries, Ltd.)
Filler: fused silica (MSR-2212 manufactured by Tatsumori Ltd.)
The physical property values were measured under the following conditions.

<Measurement Condition for Heat Resistance (Tg)>

Dynamic viscoelasticity measuring instrument: DMA-2980, TA-instruments

Measurement temperature range: −30° C. to 280° ° C.

Temperature raising rate: 2° C./min

Tg: the peak point of Tan d was defined as Tg.

<Measurement Condition for Bending Strength, and Bending Elastic Modulus>

Measured according to JIS K-7074.

<Measurement Condition for IZOD Impact Test>

Measured according to JIS K-6911.

<Water Absorption Rate>

Water absorption rate: weight increase rate (%) after boiling a disc-shaped test piece having a diameter of 5 cm and a thickness of 4 mm in water at 100° C. for 72 hours

TABLE 2

|  | Example 3 | Example 4 | Comparative Example 2 | Comparative Example 3 |
| --- | --- | --- | --- | --- |
| EP1 | 100 |  |  |  |
| EP2 |  | 100 |  |  |
| EP3 |  |  | 100 |  |
| jER-828 |  |  |  | 100 |
| TEDDM | 35 | 36 | 33 | 41 |
| Tg [° C.] | 219 | 226 | 201 | 185 |
| Bending strength [MPa] | 108 | 98 | 104 | 81 |
| Bending elastic modulus [GPa] | 2.6 | 2.6 | 2.3 | 2.0 |
| Water absorption rate [%] | 1.0 | 1.1 | 0.8 | 1.8 |

TABLE 3

|  | Example 5 | Comparative Example 4 | Comparative Example 5 |
| --- | --- | --- | --- |
| EP1 | 100 |  |  |
| EP3 |  | 100 |  |
| jER-828 |  |  | 100 |
| 4,4'-DDS | 27 | 26 | 33 |
| Tg [° C.] | 234 | 214 | 215 |
| Bending strength [MPa] | 120 | 135 | 123 |
| Bending elastic modulus [GPa] | 3.1 | 3.1 | 2.8 |
| Water absorption rate [%] | 1.0 | 0.9 | 1.8 |

TABLE 4

|  | Example 6 | Comparative Example 6 | Comparative Example 7 |
| --- | --- | --- | --- |
| EP1 | 100 |  |  |
| EP3 |  | 100 |  |
| EOCN-1020 |  |  | 100 |
| PN | 35 | 33 | 40 |
| Tg [° C.] | 186 | 178 | 185 |
| Bending strength [MPa] | 89 | 68 | 83 |
| Bending elastic modulus [GPa] | 3.0 | 3.1 | 3.1 |
| Water absorption rate [%] | 1.1 | 1.2 | 1.2 |

TABLE 5

| Compounding composition table |  | Example 7 | Comparative Example 8 |
| --- | --- | --- | --- |
| Epoxy resin | EP-1 | 11.0 |  |
|  | EOCN-1020 |  | 11.0 |
| Curing agent | MEHC-7800SS | 8.2 | 9.7 |
| Curing accelerator | TPP | 0.1 | 0.1 |
| Filler | Silica | 94 | 101 |
| Burning time (s) |  | 35 | 166 |
| Determination |  | V-0 | V-2 |

From the results of Tables 2 to 4, it is confirmed that the cured product in Examples of the present application is excellent in high heat resistance (Tg), high strength, high elasticity, and low water absorption property.

From the results in Table 5, it is confirmed that Example 7 has a short burning time and is excellent in flame retardancy. On the other hand, it is confirmed that Comparative Example 8 using the orthocresol novolac type epoxy resin has a long burning time and is poor in flame retardancy.

INDUSTRIAL APPLICABILITY

The epoxy resin according to the present invention is excellent in high heat resistance, high strength, high elasticity, and low water absorption property, and is thus suitable as a carbon fiber reinforced composite material. The carbon fiber reinforced composite material using the epoxy resin according to the present invention is lightweight and has excellent resistance to external impacts and thus can be suitably used for many structural materials for aircraft members such as fuselage, wing, tail, blades, fairings, cowls, doors, seats and interior materials, spacecraft members such as motor cases and wings, artificial satellite members such as structures and antennas, automobile members such as outer panels, chassis, aerodynamic members and seats, railroad vehicle members such as structures and scats, and ship members such as hulls and seats.

The present application is based on Japanese patent application No. 2020-51069 filed on Mar. 23, 2020, the contents of which are incorporated herein by reference.

The invention claimed is:

1. An epoxy resin represented by the following formula (1), wherein in a total amount of an epoxy compound represented by n=1 in the epoxy resin, a total content of an epoxy compound represented by the following formula (2) and an epoxy compound represented by the following formula (3) is 1 area % or more and less than 70 area % in HPLC area percentage,

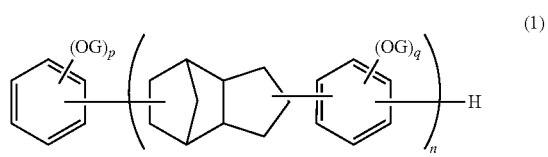

in the formula (1), G represents a substituted or unsubstituted glycidyl group, p and q are present independently of each other and each represents a real number of 1 or 2, and n represents a real number of 1 to 20, (2)

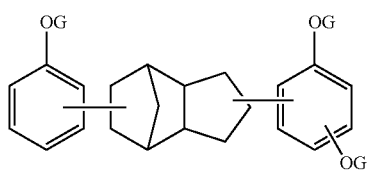

in the formula (2), G represents a substituted or unsubstituted glycidyl group, and (3)

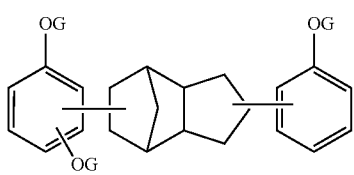

in the formula (3), G represents a substituted or unsubstituted glycidyl group.

2. The epoxy resin according to claim 1, wherein an epoxy equivalent is 200 g/eq. or more and less than 230 g/eq.

3. An epoxy resin composition comprising: the epoxy resin according to claim 2; and a curing agent.

4. An epoxy resin composition comprising:
the epoxy resin according to claim 1; and
a curing agent.

5. The epoxy resin composition according to claim 4, wherein the curing agent is an amine-based curing agent or a phenol-based curing agent.

6. A carbon fiber reinforced material comprising the epoxy resin composition according to claim 5.

7. A resin sheet obtained by coating a support base with the epoxy resin composition according to claim 5.

8. A prepreg obtained by impregnating a carbon fiber with the epoxy resin composition according to claim 5.

9. A carbon fiber reinforced material comprising the epoxy resin composition according to claim 4.

10. A resin sheet obtained by coating a support base with the epoxy resin composition according to claim 4.

11. A prepreg obtained by impregnating a carbon fiber with the epoxy resin composition according to claim 4.

12. A carbon fiber reinforced composite material obtained by curing the prepreg according to claim 11.

13. A cured product obtained by curing the epoxy resin composition according to claim 4.

14. An epoxy compound represented by the following formula (2) or the following formula (3), wherein (2)

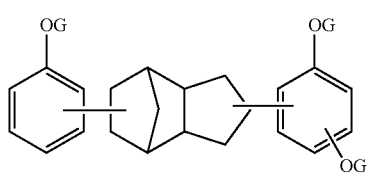

in the formula (2), G represents a substituted or unsubstituted glycidyl group, and (3)

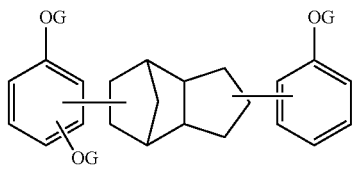

in the formula (3), G represents a substituted or unsubstituted glycidyl group.

15. An epoxy resin composition comprising: the epoxy compound according to claim 3; and a curing agent.

16. A resin sheet obtained by coating a support base with the epoxy resin composition according to claim 15.

17. A prepreg obtained by impregnating a carbon fiber with the epoxy resin composition according to claim 15.

18. An epoxy resin represented by the following formula (1), wherein a product of GPC area percentage and HPLC area percentage is 1 area % or more and 20 area % or less, the GPC area percentage indicating a content of the epoxy compound represented by n=1 in the epoxy resin, the HPLC area percentage indicating the total contents of the epoxy compound represented by the following formula (2) and the epoxy compound represented by the following formula (3) in the total amount of the epoxy compound represented by n=1, in a total amount of an epoxy compound represented by n=1 in the epoxy resin, a total content of an epoxy compound represented by the following formula (2) and an epoxy compound represented by the following formula (3) is 1 area % or more and less than 70 area % in HPLC area percentage, (4)

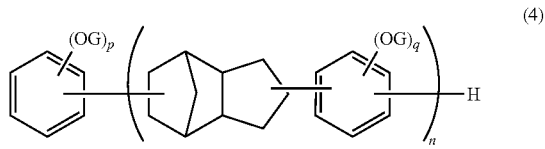

in the formula (1), G represents a substituted or unsubstituted glycidyl group, p and q are present independently of each other and each represents a real number of 1 or 2, and n represents a real number of 1 to 20, (2)

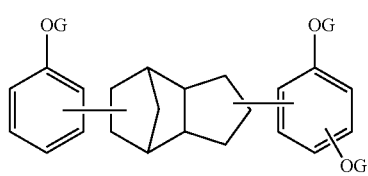

in the formula (2), G represents a substituted or unsubstituted glycidyl group, and
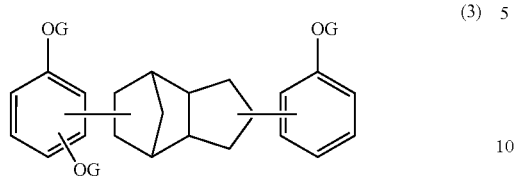
(3)
in the formula (3), G represents a substituted or unsubstituted glycidyl group.
* * * * *